United States Patent
Wang et al.

(10) Patent No.: US 10,609,675 B2
(45) Date of Patent: Mar. 31, 2020

(54) PAGING METHOD, SYNCHRONIZATION METHOD, AND USER EQUIPMENT FOR DEVICE TO DEVICE COMMUNICATION

(71) Applicant: HUAWEI TECHNOLOGIES CO., LTD., Shenzhen, Guangdong (CN)

(72) Inventors: Da Wang, Beijing (CN); Jian Wang, Beijing (CN); Bin Liu, San Diego, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/762,924

(22) PCT Filed: Sep. 25, 2015

(86) PCT No.: PCT/CN2015/090770
§ 371 (c)(1),
(2) Date: Mar. 23, 2018

(87) PCT Pub. No.: WO2017/049606
PCT Pub. Date: Mar. 30, 2017

(65) Prior Publication Data
US 2018/0295604 A1    Oct. 11, 2018

(51) Int. Cl.
*H04W 68/00* (2009.01)
*H04W 88/04* (2009.01)
(Continued)

(52) U.S. Cl.
CPC ......... *H04W 68/005* (2013.01); *H04W 48/16* (2013.01); *H04W 56/0015* (2013.01); *H04W 88/04* (2013.01); *H04W 92/18* (2013.01)

(58) Field of Classification Search
CPC ............... H04W 68/005; H04W 48/16; H04W 56/0015; H04W 88/04; H04W 92/18
See application file for complete search history.

(56) References Cited

U.S. PATENT DOCUMENTS

2006/0242227 A1    10/2006 Rao et al.
2009/0017844 A1*    1/2009 Li ..................... H04W 68/00
455/458
(Continued)

FOREIGN PATENT DOCUMENTS

CN    101047977 A    10/2007
CN    101790872 A    7/2010
(Continued)

OTHER PUBLICATIONS

S1-151077 Sony,"Smarter Use Case on IoT: Wearables—Sports and Fitness",3GPP TSG-SA WG1 Meeting #70, Los Cabos, Mexico, Apr. 13-17, 2015,total 2 pages.
(Continued)

*Primary Examiner* — Pakee Fang
(74) *Attorney, Agent, or Firm* — Fish & Richardson P.C.

(57) ABSTRACT

The present disclosure provides example paging methods, synchronization methods, and user equipment. In one example paging method, a first device determines second paging signals used to page second devices and sends the second paging signals to the second devices connected to the first device. The second devices determine, according to the second paging signals, whether the second devices are paged second devices, so that the first device or a network side device pages the second devices.

14 Claims, 7 Drawing Sheets

(51) Int. Cl.
*H04W 92/18* (2009.01)
*H04W 48/16* (2009.01)
*H04W 56/00* (2009.01)

(56) References Cited

U.S. PATENT DOCUMENTS

2009/0232034 A1 9/2009 Li et al.
2015/0223155 A1 8/2015 Turtinen et al.

FOREIGN PATENT DOCUMENTS

| CN | 103491647 A | 1/2014 |
| CN | 104066170 A | 9/2014 |
| CN | 104883728 A | 9/2015 |
| WO | 2015072789 A1 | 5/2015 |
| WO | 2016045103 A1 | 3/2016 |

OTHER PUBLICATIONS

International Search Report issued in International Application No. PCT/CN2015/090770 dated Jun. 7, 2016, 14 pages.
XP050787051 R1-141380 Ericsson,"Synchronization Signals and Channel Design for D2D Discovery and Communication",3GPP TSG RAN WG1 Meeting #76bis,Shenzhen, China, Mar. 31-Apr. 4, 2014,total 10 pages.
XP050735444 R1-135803 Ericsson,"Synchronization Procedures for D2D Discovery and Communication",3GPP TSG RAN WG1 Meeting #75,San Francisco, USA, Nov. 11-15, 2013,total 6 pages.
XP050977777 R1-153414 ZTE,"Discussions on Relay UE selection and discovery",3GPP T5G-RAN WG1 Meeting #81,Fukuoka, Japan, May 25-29, 2015,total 8 pages.
Extended European Search Report issued in European Application No. 15904482.5 dated Jun. 14, 2018, 11 pages.
Office Action issued in Chinese Application No. 201580080000.X dated Jun. 5, 2019, 8 pages.

* cited by examiner

A first device determines a second paging signal, where the second paging signal is a paging signal used by the first device to page a second device, the first device is a device that accesses a network side device, and the second device is a device that can access the network side device by using the first device ⟶ 101

The first device sends the second paging signal ⟶ 102

A second device receives a second paging signal sent by a first device, where the second paging signal is a paging signal used by the first device to page the second device, the first device is a device that accesses a network side device, and the second device is a device that can access the network side device by using the first device ~201

The second device determines, according to the second paging signal, whether the second device is a paged second device; and if the second device is the paged second device, the second device accesses the network side device by using the first device, or if the second device is not the paged second device, the second device continues sleeping ~202

FIG. 3

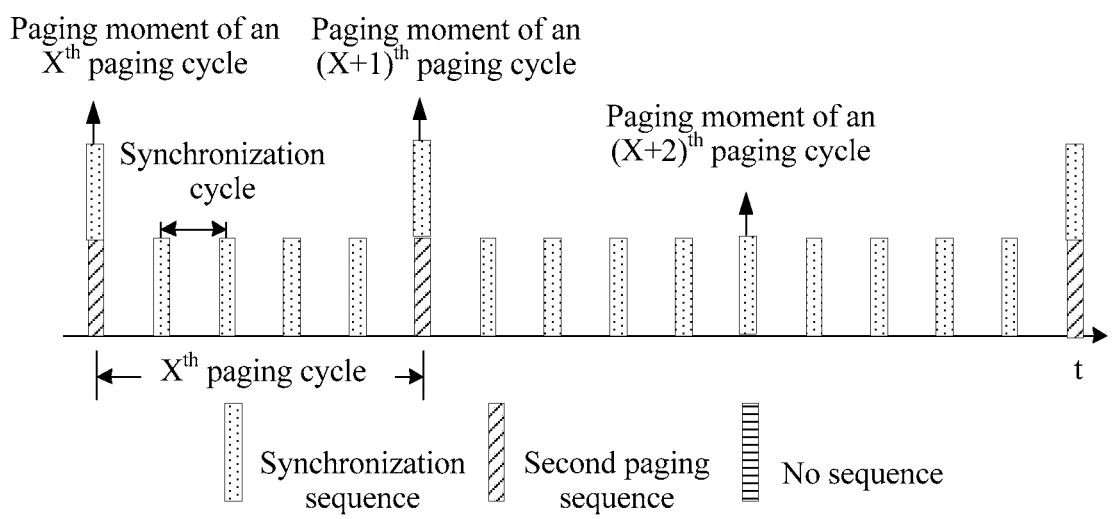

FIG. 4A

PAGING METHOD, SYNCHRONIZATION METHOD, AND USER EQUIPMENT FOR DEVICE TO DEVICE COMMUNICATION

CROSS-REFERENCE TO RELATED APPLICATIONS

This application is a national stage of International Application No. PCT/CN2015/090770, filed on Sep. 25, 2015, which is hereby incorporated by reference in its entirety.

TECHNICAL FIELD

Embodiments of the present invention relate to communications technologies, and in particular, to a paging method, a synchronization method, and user equipment.

BACKGROUND

In a device-to-device (Device to Device, D2D) communication scenario, user equipment may use another user equipment, in addition to a network side device (for example, a base station), to access a network. In this process, user equipment that provides a network access function for the another user equipment is a first device, for example, a high-capability device such as a smartphone; and user equipment that accesses the network by using the first device is a second device, for example, a low-capability device such as a wearable device.

In a communication process, when the first device does not perform service transmission or receiving, the first device is in a sleep (Idle) state. When the network side device needs to send a service to the first device in the idle state, the network side device needs to send a paging message to page the first device. The first device cyclically awakes, receives the paging message, and determines, according to the paging message, whether the network side device is paging the first device. In the paging process, the first device first decodes a paging control channel (Paging Control Channel, PCCH), so as to determine whether there is an indication of the paging message in the PCCH. If there is no indication of the paging message in the PCCH, the first device continues sleeping, or if there is an indication of the paging message in the PCCH, the first device receives a paging message of a designated location, that is, a paging channel (Paging Channel, PCH), further decodes the PCH, and checks whether there is an identity (Identity, ID) of the first device in the PCH; and if there is no identity of the first device in the PCH, the first device continues sleeping, or if there is an identity of the first device in the PCH, the first device accesses the network.

The foregoing paging method is a method for paging the first device by the network side device. However, in addition to the first device, the second device further needs to be paged. For example, the network side device pages the second device, or the first device pages the second device. Therefore, a manner of paging the second device is a problem that urgently needs to be resolved in the industry.

SUMMARY

Embodiments of the present invention provide a paging method, a synchronization method, and user equipment, so as to page a second device.

According to a first aspect, an embodiment of the present invention provides a paging method, including:

determining, by a first device, a second paging signal, where the second paging signal is a paging signal used by the first device to page a second device, the first device is a device that accesses a network side device, and the second device is a device that can access the network side device by using the first device; and sending, by the first device, the second paging signal to the second device.

In a first possible implementation of the first aspect, before the determining, by a first device, a second paging signal, the method further includes:

receiving, by the first device, a first paging signal sent by the network side device, where the first paging signal is a paging signal used by the network side device to page the second device; and the determining, by a first device, a second paging signal includes:

determining, by the first device, the second paging signal according to the first paging signal.

With reference to the first possible implementation of the first aspect, in a second possible implementation of the first aspect, the method further includes:

sending, by the first device, a synchronization signal to the second device according to a synchronization cycle.

With reference to the second possible implementation of the first aspect, in a third possible implementation of the first aspect, the first paging signal carries identities of M second devices, and the first device is connected to N second devices, where N≥1, 1≤M≤N, and N and M are positive integers; and the determining, by the first device, the second paging signal according to the first paging signal includes:

determining, by the first device, L second paging signals according to the identities of the M second devices, where the L second paging signals are different from each other, and 1≤L≤M;

the sending, by the first device, the second paging signal includes:

sending, by the first device, the L second paging signals when the first device needs to page the M second devices at a paging moment of an $X^{th}$ paging cycle, where the $X^{th}$ paging cycle is any paging cycle of paging the second device by the first device; and the sending, by the first device, a synchronization signal to the second device according to a synchronization cycle includes:

sending, by the first device, the synchronization signal to the N second devices according to the synchronization cycle.

With reference to the third possible implementation of the first aspect, in a fourth possible implementation of the first aspect, the synchronization cycle is shorter than or equal to the paging cycle, the $X^{th}$ paging cycle includes P synchronization moments, and the paging moment of the $X^{th}$ paging cycle and the P synchronization moments meet either of the following conditions: one of the P synchronization moments is the same as the paging moment of the $X^{th}$ paging cycle, or none of the P synchronization moments is the same as the paging moment of the $X^{th}$ paging cycle, where P≥1.

With reference to the third possible implementation of the first aspect, in a fifth possible implementation of the first aspect, the synchronization cycle is shorter than the paging cycle, and the sending, by the first device, the L second paging signals when the first device needs to page the M second devices at a paging moment of an $X^{th}$ paging cycle and the sending, by the first device, the synchronization signal to the N second devices according to the synchronization cycle include:

sending, by the first device, a synchronization signal to the N second devices at each synchronization moment of P synchronization cycles in sequence, and sending the L second paging signals to the N second devices at the paging moment of the $X^{th}$ paging cycle, where the P synchronization cycles are earlier than the paging moment of the $X^{th}$ paging cycle, and P≥1.

With reference to the third possible implementation of the first aspect, in a sixth possible implementation of the first aspect, the synchronization cycle is equal to the paging cycle, and the sending, by the first device, the L second paging signals when the first device needs to page the M second devices at a paging moment of an $X^{th}$ paging cycle and the sending, by the first device, the synchronization signal to the N second devices according to the synchronization cycle include:

sending, by the first device, a synchronization signal to the N second devices at a synchronization moment of P synchronization cycles, and sending M second paging signals to the N second devices at the paging moment of the $X^{th}$ paging cycle, where the synchronization moment of the P synchronization cycles is the same as the paging moment of the $X^{th}$ paging cycle, and P=1.

With reference to any one of the third to the sixth possible methods of the first aspect, in a seventh possible implementation of the first aspect, the method further includes:

if the first device does not need to page the M second devices at the paging moment of the $X^{th}$ paging cycle, sending, by the first device, the synchronization signal to the N second devices at the synchronization moment of the P synchronization cycles, but stopping sending the L second paging signals to the N second devices at the paging moment of the $X^{th}$ paging cycle; or stopping sending, by the first device, the synchronization signal to the N second devices at the synchronization moment of the P synchronization cycles, stopping sending the L second paging signals to the N second devices at the paging moment of the $X^{th}$ paging cycle, and determining whether duration following a paging moment of an $(X-1)^{th}$ paging cycle exceeds a first threshold, and if the duration following the paging moment of the $(X-1)^{th}$ paging cycle exceeds the first threshold, sending Q measurement signals to the N second devices, where Q≥1.

With reference to the seventh possible implementation of the first aspect, in an eighth possible implementation of the first aspect, the measurement signal is the same as or different from the synchronization signal.

With reference to any one of the third to the eighth possible methods of the first aspect, in a ninth possible implementation of the first aspect, the L second paging signals are L paging sequences orthogonal to each other, and the synchronization signal is a synchronization sequence orthogonal to each paging sequence.

According to a second aspect, an embodiment of the present invention provides a paging method, including:

receiving, by a second device, a second paging signal sent by a first device, where the second paging signal is a paging signal used by the first device to page the second device, the first device is a device that accesses a network side device, and the second device is a device that can access the network side device by using the first device; and determining, by the second device according to the second paging signal, whether the second device is a paged second device; and if the second device is the paged second device, accessing the network side device by using the first device, or if the second device is not the paged second device, continuing sleeping by the second device.

In a first possible implementation of the second aspect, the second paging signal is sent after the first device receives a first paging signal sent by the network side device, and the first paging signal is a paging signal used by the network side device to page the second device.

With reference to the first possible implementation of the second aspect, in a second possible implementation of the second aspect, the method further includes:

receiving, by the second device, a synchronization signal that is sent by the first device according to a synchronization cycle; and synchronizing, by the second device, with the first device according to the synchronization signal.

With reference to the second possible implementation of the second aspect, in a third possible implementation of the second aspect, the first paging signal carries identities of M second devices, the first device is connected to N second devices, and the N second devices include the M second devices, where N≥1, 1≤M≤N, and N and M are positive integers;

the receiving, by a second device, a second paging signal sent by a first device includes:

if the first device needs to page the M second devices at a paging moment of an $X^{th}$ paging cycle, receiving, by the second device, L second paging signals sent by the first device at the paging moment of the $X^{th}$ paging cycle, where the $X^{th}$ paging cycle is any paging cycle of paging the second device by the first device, the L second paging signals are determined by the first device according to the first paging signal, and the L second paging signals are different from each other, where 1≤L≤M; and the determining, by the second device according to the second paging signal, whether the second device is a paged second device includes:

determining, by the second device according to the L second paging signals, whether the second device is the second device paged by the network side device.

With reference to the third possible implementation of the second aspect, in a fourth possible implementation of the second aspect, the synchronization cycle is shorter than or equal to the paging cycle, the $X^{th}$ paging cycle includes P synchronization moments, and the paging moment of the $X^{th}$ paging cycle and the P synchronization moments meet either of the following conditions: one of the P synchronization moments is the same as the paging moment of the $X^{th}$ paging cycle, or none of the P synchronization moments is the same as the paging moment of the $X^{th}$ paging cycle, where P≥1.

With reference to the third possible implementation of the second aspect, in a fifth possible implementation of the second aspect, the synchronization cycle is shorter than the paging cycle, and the receiving, by the second device, L second paging signals sent by the first device at the paging moment of the $X^{th}$ paging cycle and the receiving, by the second device, a synchronization signal that is sent by the first device according to a synchronization cycle include:

receiving, by the second device, a synchronization signal sent by the first device at each synchronization moment of P synchronization cycles in sequence, and receiving the L second paging signals sent by the first device at the paging moment of the $X^{th}$ paging cycle, where the P synchronization cycles are earlier than the paging moment of the $X^{th}$ paging cycle, and P≥1.

With reference to the third possible implementation of the second aspect, in a sixth possible implementation of the second aspect, the synchronization cycle is equal to the paging cycle, and the receiving, by the second device, L second paging signals sent by the first device at the paging moment of the $X^{th}$ paging cycle and the receiving, by the second device, a synchronization signal that is sent by the first device according to a synchronization cycle include:

receiving, by the second device, a synchronization signal sent by the first device to the N second devices at a synchronization moment of P synchronization cycles and the L second paging signals sent at the paging moment of the $X^{th}$ paging cycle, where the synchronization moment of the P synchronization cycles is the same as the paging moment of the $X^{th}$ paging cycle, and P=1.

With reference to any one of the third to the sixth possible implementations of the second aspect, in a seventh possible implementation of the second aspect, the method further includes:

if the first device does not need to page the M second devices at the paging moment of the $X^{th}$ paging cycle, receiving, by the second device, the synchronization signal sent by the first device at the synchronization moment of the P synchronization cycles; or if duration following a paging moment of an $(X-1)^{th}$ paging cycle exceeds a first threshold, receiving Q measurement signals sent by the first device, where the measurement signal is the same as or different from the synchronization signal, and Q≥1.

With reference to the seventh possible implementation of the second aspect, in an eighth possible implementation of the second aspect, the measurement signal is specifically a measurement sequence, the second device pre-stores the measurement sequence, and if duration following a paging moment of an $(X-1)^{th}$ paging cycle exceeds a first threshold, after the receiving Q measurement signals sent by the first device, the method further includes:

determining, by the second device, whether a cross-correlation value between the pre-stored measurement sequence and the received measurement sequence exceeds a second threshold; and if the cross-correlation value between the pre-stored measurement sequence and the received measurement sequence exceeds the second threshold, determining that the second device is within coverage of the first device.

With reference to any one of the third to the eighth possible implementations of the second aspect, in a ninth possible implementation of the second aspect, the L second paging signals are L paging sequences orthogonal to each other, and the synchronization signal is a synchronization sequence orthogonal to each paging sequence.

With reference to the ninth possible implementation of the second aspect, in a tenth possible implementation of the second aspect, the second device stores a dedicated paging sequence, the dedicated paging sequence is a sequence learned by the second device, and the determining, by the second device according to the L second paging signals, whether the second device is a second device paged by the network side device includes:

determining, by the second device, whether a cross-correlation value between the dedicated paging sequence and one of the L paging sequences exceeds a third threshold; and if the cross-correlation value between the dedicated paging sequence and the one of the L paging sequences exceeds the third threshold, determining that the second device is the second device paged by the network side device.

According to a third aspect, an embodiment of the present invention provides a synchronization method, including:

generating, by a first device, a synchronization cycle and a synchronization signal; and sending, by the first device, the synchronization signal to N second devices according to the synchronization cycle, where the first device is a device that accesses a network side device, and the first device is connected to the N second devices, where N≥1, and N is a positive integer.

According to a fourth aspect, an embodiment of the present invention provides a synchronization method, including:

receiving, by a second device, a synchronization signal sent by a first device according to a synchronization cycle, where the first device is a device that accesses a network side device, and the first device is connected to N second devices, where N≥1, and N is a positive integer; and synchronizing, by the second device, with the first device according to the synchronization signal.

In a first possible implementation of the fourth aspect, the synchronization signal is specifically a synchronization sequence, each second device stores the synchronization sequence, and the synchronizing, by the second device, with the first device according to the synchronization signal includes:

determining, by the second device, whether a cross-correlation value between the synchronization sequence stored in the second device and the received synchronization sequence exceeds a fourth threshold; and if the cross-correlation value between the synchronization sequence stored in the second device and the received synchronization sequence exceeds the fourth threshold, determining that the second device synchronizes with the first device.

According to a fifth aspect, an embodiment of the present invention provides user equipment, the user equipment is a first device, and the first device includes:

a processor, configured to determine a second paging signal, where the second paging signal is a paging signal used by a first device to page a second device, the first device is a device that accesses a network side device, and the second device is a device that can access the network side device by using the first device; and a transmitter, configured to send the second paging signal determined by the processor to the second device.

In a first possible implementation of the fifth aspect, the device further includes:

a receiver, configured to: before the processor determines the second paging signal, receive a first paging signal sent by the network side device, where the first paging signal is a paging signal used by the network side device to page the second device; where the processor is specifically configured to determine the second paging signal according to the first paging signal.

With reference to the first possible implementation of the fifth aspect, in a second possible implementation of the fifth aspect, the transmitter is further configured to send a synchronization signal to the second device according to a synchronization cycle.

With reference to the second possible implementation of the fifth aspect, in a third possible implementation of the fifth aspect, the first paging signal carries identities of M second devices, and the first device is connected to N second devices, where N≥1, 1≤M≤N, and N and M are positive integers;

the processor is specifically configured to determine L second paging signals according to the identities of the M second devices, where the L second paging signals are different from each other, and 1≤L≤M; and the transmitter is specifically configured to: send the L second paging signals when the M second devices need to be paged at a paging moment of an $X^{th}$ paging cycle, where the $X^{th}$ paging cycle is any paging cycle of paging the second device by the first device; and send the synchronization signal to the N second devices according to the synchronization cycle.

With reference to the third possible implementation of the fifth aspect, in a fourth possible implementation of the fifth aspect, the synchronization cycle is shorter than or equal to the paging cycle, the $X^{th}$ paging cycle includes P synchronization moments, and the paging moment of the $X^{th}$ paging cycle and the P synchronization moments meet either of the following conditions: one of the P synchronization moments is the same as the paging moment of the $X^{th}$ paging cycle, or none of the P synchronization moments is the same as the paging moment of the $X^{th}$ paging cycle, where P≥1.

With reference to the third possible implementation of the fifth aspect, in a fifth possible implementation of the fifth aspect, the synchronization cycle is shorter than the paging cycle, and the transmitter is specifically configured to: send a synchronization signal to the N second devices at each synchronization moment of P synchronization cycles in sequence, and send the L second paging signals to the N second devices at the paging moment of the $X^{th}$ paging cycle, where the P synchronization cycles are earlier than the paging moment of the $X^{th}$ paging cycle, and P≥1.

With reference to the third possible implementation of the fifth aspect, in a sixth possible implementation of the fifth aspect, the synchronization cycle is equal to the paging cycle, and the transmitter is specifically configured to: send a synchronization signal to the N second devices at a synchronization moment of P synchronization cycles, and send M second paging signals to the N second devices at the paging moment of the $X^{th}$ paging cycle, where the synchronization moment of the P synchronization cycles is the same as the paging moment of the $X^{th}$ paging cycle, and P=1.

With reference to any one of the third to the sixth possible methods of the fifth aspect, in a seventh possible implementation of the fifth aspect, the transmitter is further configured to: if the first device does not need to page the M second devices at the paging moment of the $X^{th}$ paging cycle, send the synchronization signal to the N second devices at the synchronization moment of the P synchronization cycles, but stop sending the L second paging signals to the N second devices at the paging moment of the $X^{th}$ paging cycle; or stop sending the synchronization signal to the N second devices at the synchronization moment of the P synchronization cycles, stop sending the L second paging signals to the N second devices at the paging moment of the $X^{th}$ paging cycle, and determine whether duration following a paging moment of an $(X-1)^{th}$ paging cycle exceeds a first threshold, and if the duration following the paging moment of the $(X-1)^{th}$ paging cycle exceeds the first threshold, send Q measurement signals to the N second devices, where Q≥1.

With reference to the seventh possible implementation of the fifth aspect, in an eighth possible implementation of the fifth aspect, the measurement signal is the same as or different from the synchronization signal.

With reference to any one of the third to the eighth possible methods of the fifth aspect, in a ninth possible implementation of the fifth aspect, the L second paging signals are L paging sequences orthogonal to each other, and the synchronization signal is a synchronization sequence orthogonal to each paging sequence.

According to a sixth aspect, an embodiment of the present invention provides user equipment, the user equipment is a second device, and the second device includes:

a receiver, configured to receive a second paging signal sent by a first device, where the second paging signal is a paging signal used by the first device to page the second device, the first device is a device that accesses a network side device, and the second device is a device that can access the network side device by using the first device; and a processor, configured to: determine, according to the second paging signal received by the receiver, whether the second device is a paged second device, where if the second device is the paged second device, the second device accesses the network side device by using the first device, or if the second device is not the paged second device, the second device continues sleeping.

In a first possible implementation of the sixth aspect, the second paging signal is sent after the first device receives a first paging signal sent by the network side device, and the first paging signal is a paging signal used by the network side device to page the second device.

With reference to the first possible implementation of the sixth aspect, in a second possible implementation of the sixth aspect, the receiver is further configured to receive a synchronization signal that is sent by the first device according to a synchronization cycle; and the processor is further configured to synchronize with the first device according to the synchronization signal.

With reference to the second possible implementation of the sixth aspect, in a third possible implementation of the sixth aspect, the first paging signal carries identities of M second devices, the first device is connected to N second devices, and the N second devices include the M second devices, where N≥1, 1≤M≤N, and N and M are positive integers;

the receiver is specifically configured to: if the first device needs to page the M second devices at a paging moment of an $X^{th}$ paging cycle, receive L second paging signals sent by the first device at the paging moment of the $X^{th}$ paging cycle, where the $X^{th}$ paging cycle is any paging cycle of paging the second device by the first device, the L second paging signals are determined by the first device according to the first paging signal, and the L second paging signals are different from each other, where 1≤L≤M; and the processor is specifically configured to determine, according to the L second paging signals, whether the second device is the second device paged by the network side device.

With reference to the third possible implementation of the sixth aspect, in a fourth possible implementation of the sixth aspect, the synchronization cycle is shorter than or equal to the paging cycle, the $X^{th}$ paging cycle includes P synchronization moments, and the paging moment of the $X^{th}$ paging cycle and the P synchronization moments meet either of the following conditions: one of the P synchronization moments is the same as the paging moment of the $X^{th}$ paging cycle, or none of the P synchronization moments is the same as the paging moment of the $X^{th}$ paging cycle, where P≥1.

With reference to the third possible implementation of the sixth aspect, in a fifth possible implementation of the sixth aspect, the synchronization cycle is shorter than the paging cycle, the receiver is specifically configured to receive the L second paging signals sent by the first device at the paging moment of the $X^{th}$ paging cycle, where the P synchronization cycles are earlier than the paging moment of the $X^{th}$ paging cycle, and P≥1.

With reference to the third possible implementation of the sixth aspect, in a sixth possible implementation of the sixth aspect, the synchronization cycle is equal to the paging cycle, and the receiver is specifically configured to receive a synchronization signal sent by the first device to the N second devices at a synchronization moment of P synchronization cycles and the L second paging signals sent at the paging moment of the $X^{th}$ paging cycle, where the synchronization moment of the P synchronization cycles is the same as the paging moment of the $X^{th}$ paging cycle, and P=1.

With reference to any one of the third to the sixth possible implementations of the sixth aspect, in a seventh possible implementation of the sixth aspect, the receiver is further configured to: if the first device does not need to page the M second devices at the paging moment of the $X^{th}$ paging cycle, receive the synchronization signal sent by the first device at the synchronization moment of the P synchronization cycles; or if duration following a paging moment of an $(X-1)^{th}$ paging cycle exceeds a first threshold, receive Q measurement signals sent by the first device, where the measurement signal is the same as or different from the synchronization signal, and Q≥1.

With reference to the seventh possible implementation of the sixth aspect, in an eighth possible implementation of the sixth aspect, the measurement signal is specifically a measurement sequence, and the second device pre-stores the measurement sequence; and the processor is further configured to: if the duration following the paging moment of the $(X-1)^{th}$ paging cycle exceeds the first threshold, after the receiver receives the Q measurement signals sent by the first device, determine whether a cross-correlation value between the pre-stored measurement sequence and the received measurement sequence exceeds a second threshold; and if the cross-correlation value between the pre-stored measurement sequence and the received measurement sequence exceeds the second threshold, determine that the second device is within coverage of the first device.

With reference to any one of the third to the eighth possible implementations of the sixth aspect, in a ninth possible implementation of the sixth aspect, the L second paging signals are L paging sequences orthogonal to each other, and the synchronization signal is a synchronization sequence orthogonal to each paging sequence.

With reference to the ninth possible implementation of the sixth aspect, in a tenth possible implementation of the sixth aspect, the second device stores a dedicated paging sequence, and the dedicated paging sequence is a sequence learned by the second device; and the processor is specifically configured to: determine whether a cross-correlation value between the dedicated paging sequence and one of the L paging sequences exceeds a third threshold; and if the cross-correlation value between the dedicated paging sequence and the one of the L paging sequences exceeds the third threshold, determine that the second device is the second device paged by the network side device.

According to a seventh aspect, an embodiment of the present invention provides user equipment, the user equipment is a first device, and the first device includes:

a processor, configured to generate a synchronization cycle and a synchronization signal; and a transmitter, configured to send the synchronization signal to N second devices according to the synchronization cycle generated by the processor, where the first device is a device that accesses a network side device, and the first device is connected to the N second devices, where N≥1, and N is a positive integer.

According to an eighth aspect, an embodiment of the present invention provides user equipment, the user equipment is a second device, and the second device includes:

a receiver, configured to receive a synchronization signal sent by a first device according to a synchronization cycle, where the first device is a device that accesses a network side device, and the first device is connected to N second devices, where N≥1, and N is a positive integer; and a processor, configured to synchronize with the first device according to the synchronization signal received by the receiver.

In a first possible implementation of the eighth aspect, the synchronization signal is specifically a synchronization sequence, and each second device stores the synchronization sequence; and the processor is specifically configured to: determine whether a cross-correlation value between the synchronization sequence stored in the second device and the received synchronization sequence exceeds a fourth threshold; and if the cross-correlation value between the synchronization sequence stored in the second device and the received synchronization sequence exceeds the fourth threshold, determine that the second device synchronizes with the first device.

According to the paging method, the synchronization method, and the user equipment that are provided in the embodiments of the present invention, the first device determines second paging signals used to page second devices, and sends the second paging signals to the second devices connected to the first device, so that the second devices determine, according to the second paging signals, whether the second devices are paged second devices, so that the first device or the network side device pages the second devices.

BRIEF DESCRIPTION OF DRAWINGS

FIG. 3 is a flowchart of Embodiment 2 of a paging method according to the present invention;

FIG. 4A is a schematic diagram of a first manner provided in an embodiment of a paging method according to the present invention;

DESCRIPTION OF EMBODIMENTS

Figures 1, 2:
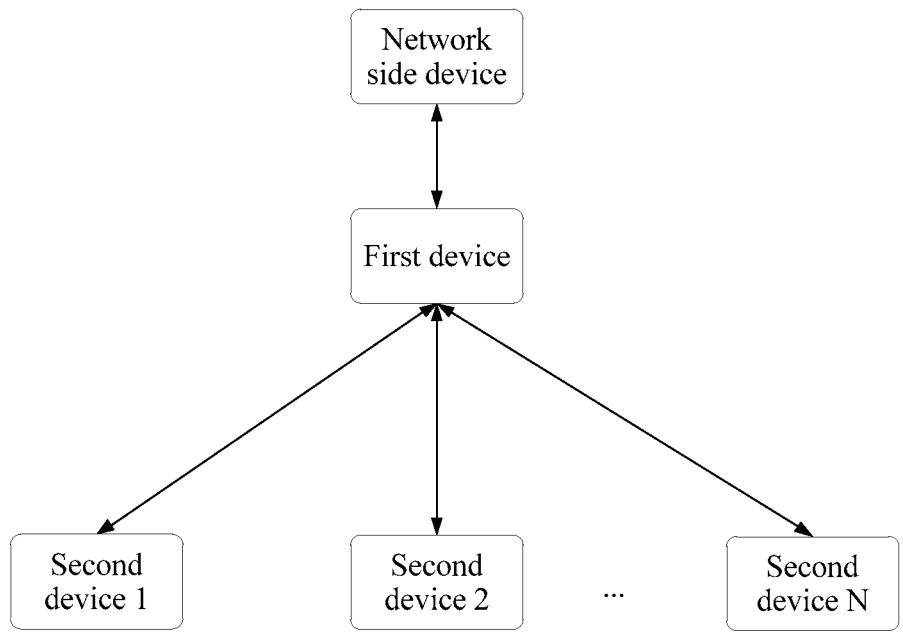
FIG. 1 is a schematic diagram of a network architecture to which a paging method according to the present invention is applicable.
FIG. 2 is a flowchart of Embodiment 1 of a paging method according to the present invention.

FIG. 1 is a schematic diagram of a network architecture to which a paging method according to the present invention is applicable. As shown in FIG. 1, in the network architecture, a first device is a device that accesses a network side device, and the first device is connected to N second devices, where N≥1, and N is an integer. The second devices can access the network side device by using the first device. The first device is a high-capability device such as a smartphone, the first device can serve as a relay node to assist a low-capability device in accessing the network side device, and the second device is a low-capability device such as a wearable device. With reference to FIG. 1, the following describes in detail a paging method and a synchronization method according to the present invention.

FIG. 2 is a flowchart of Embodiment 1 of a paging method according to the present invention. An execution body in this embodiment is a first device, and the paging method is applicable to a scenario in which the first device or a network side device needs to page a second device. Specifically, this embodiment includes the following steps:

101. The first device determines a second paging signal, where the second paging signal is a paging signal used by the first device to page the second device, the first device is a device that accesses the network side device, and the second device is a device that can access the network side device by using the first device.

Generally, one first device may be connected to a plurality of second devices. Therefore, in embodiments of the present invention, unless otherwise specified, for a specific first device, paging the second device means paging all or some second devices connected to the first device, each second device is corresponding to one second paging signal, and second paging signals of the second devices may be different or the same. In this step, the first device may pre-store a mapping table of the second paging signal and an identity of the second device; and when the first device needs to page the second device, for example, when the first device needs to send data to the second device, in this case, the first device determines, according to an identity and the like of the second device that needs to be paged, a second paging signal of the second device that needs to be paged. For another example, when the network side device needs to page the second device, the network side device sends, to the first device, a first paging message used to page the second device, and in this case, after receiving the first paging message, the first device determines, according to the identity and the like that are carried by the first paging message and that are of the second device that needs to be paged, the second paging signal of the second device that needs to be paged.

102. The first device sends the second paging signal.

After determining the second paging signals, the first device sends the second paging signals to the second devices connected to the first device, for example, the first device sends the second paging signals by means of broadcast.

According to the paging method provided in this embodiment of the present invention, the first device determines the second paging signals used to page the second devices, and sends the second paging signals to the second devices connected to the first device, so that the second devices determine, according to the second paging signals, whether the second devices are paged second devices, so that the first device or the network side device pages the second devices.

Optionally, in an embodiment of the present invention, when the first device needs to send data to the second device, the first device may actively determine the second paging signal; or after receiving a first paging signal that is sent by the network side device and that is used to page the second device, the first device passively determines the second paging signal according to the first paging signal. The following describes in detail a passive manner.

When paging the first device, the network side device sends a paging message to the first device, and the first device cyclically awakes, receives the paging message, and determines, by decoding a PCCH and a PCH, whether the first device is an object paged by the network side device. When the network side device needs to page the second device, if the method is still used, the second device needs to decode the PCCH and the PCH. However, because the second device is a device of a relatively low capability, and has a small battery capacity and a low radio-frequency capability, frequent decoding causes the second device to consume a large amount of power, and this is inconducive to continuous working of the second device. In this embodiment, the network side device may page the second device by using the first device, and the first device determines the second paging signal in a passive and triggered manner. That is, after receiving the first paging signal sent by the network side device, the first device determines the second paging signal according to the first paging signal. The first paging signal is a paging signal used by the network side device to page the second device.

According to the paging method provided in this embodiment of the present invention, when the network side device needs to page the second device, the network side device first sends, to the first device to which the second device belongs, the first paging signal used to page the second device, so that the first device determines the second paging signal according to the first paging signal and sends the second paging signal to each second device connected to the first device, so that the network side device pages the second device. In the process, when the network side device needs to page the second device, the network side device first pages the first device to which the second device belongs, and then the first device pages the second device, so that the second device does not need to frequently decode the PCCH and the PCH. This saves power consumption of the second device to some extent and ensures continuous working of the second device.

Further, optionally, that the first device determines the second paging signal according to the first paging signal is specifically as follows: The first paging signal carries identities of M second devices, the first device is connected to N second devices, and the N second devices include the M second devices, where N≥1, 1≤M≤N, and N and M are positive integers; and the first device determines L second paging signals according to the identities of the M second devices, where the L second paging signals are different from each other, and 1≤L≤M; and if L=M, it indicates that the second devices are corresponding to different second paging signals, or if L<M, it indicates that some of the second devices are corresponding to a same second paging signal and that the plurality of second devices may be paged by using the same second paging signal. In this case, that the first device sends the second paging signal is specifically as follows: When the first device needs to page the M second devices at a paging moment of an $X^{th}$ paging cycle, the first device sends the L second paging signals, where the $X^{th}$ paging cycle is any paging cycle of paging the second device by the first device.

In addition, in any paging cycle such as the $X^{th}$ paging cycle, the first device sends the second paging signal at the paging moment of the $X^{th}$ paging cycle. However, for the second device, a prerequisite for receiving the second paging signal is that the second device synchronizes with the first device, and a prerequisite for receiving the first paging signal by the first device from the network side device is that the first device synchronizes with the network side device. Therefore, the foregoing embodiment further includes synchronization of the second device. Specifically, there are the following two synchronization manners for the second device.

Manner 1: The second device synchronizes with the first device, that is, the first device sends a synchronization signal to the second device according to a synchronization cycle, so that the second device synchronizes with the first device.

Manner 2: Both the second device and the first device synchronize with the network side device, both the first device and the second device receive a primary synchronization signal PSS (Primary Synchronization Signal, PSS) and a secondary synchronization signal SSS (Secondary Synchronization Signal, PSS) that are sent by the network side device, and the first device and the second device synchronize with the network side device according to the PSS and the SSS, so that the second device synchronizes with the first device.

FIG. 3 is a flowchart of Embodiment 2 of a paging method according to the present invention. An execution body in this embodiment is a second device, and the paging method is applicable to a scenario in which a first device or a network side device needs to page the second device. Specifically, this embodiment includes the following steps:

201. The second device receives a second paging signal sent by the first device, where the second paging signal is a paging signal used by the first device to page the second device, the first device is a device that accesses the network side device, and the second device is a device that can access the network side device by using the first device.

202. The second device determines, according to the second paging signal, whether the second device is a paged second device; and if the second device is the paged second device, the second device accesses the network side device by using the first device, or if the second device is not the paged second device, the second device continues sleeping.

Specifically, in step 201 and step 202, for descriptions about the second paging signal and the like, refer to the foregoing embodiment in FIG. 2. Details are not described herein again.

According to the paging method provided in this embodiment of the present invention, the first device determines second paging signals used to page second devices, and sends the second paging signals to the second devices connected to the first device, and the second devices receive the second paging signals and determine, according to the second paging signals, whether the second devices are paged second devices, so that the first device or the network side device pages the second devices.

Optionally, in an embodiment of the present invention, the second paging signal is sent after the first device receives a first paging signal sent by the network side device, and the first paging signal is a paging signal used by the network side device to page the second device.

Optionally, in an embodiment of the present invention, the second device further receives a synchronization signal that is sent by the first device according to a synchronization cycle, and synchronizes with the first device according to the synchronization signal; or the second device receives a primary synchronization signal PSS and a secondary synchronization signal SSS that are sent by the network side device, and synchronizes with the network side device according to the PSS and the SSS, so as to synchronize with the first device.

Optionally, in an embodiment of the present invention, the second paging signal, the synchronization signal, and the like may all be sequences. Before paging or synchronization is performed, a synchronization sequence and a second paging sequence need to be configured for the first device and the second device. The following describes in detail a manner of configuring the synchronization sequence and the second paging sequence.

I. The synchronization sequence and the second paging sequence are configured for the first device.

Specifically, the synchronization sequence and the second paging sequence may be configured for the first device according to a synchronization manner of the second device.

First case: The synchronization manner of the second device is that the second device synchronizes with the first device.

In this case, N+1 sequences need to be configured for the first device, that is, N second paging sequences and one synchronization sequence that are shown in Table 1.

TABLE 1

N+1 sequences
Synchronization sequence
Second paging sequence 1
...
Second paging sequence N Specifically, the synchronization sequence is different from the N second paging sequences, for example, the synchronization sequence is orthogonal to the N second paging sequences, and the N second paging sequences may be the same or different. The synchronization sequence has the following functions: a synchronization function and a measurement function. After receiving the synchronization sequence, the second device determines, by detecting the synchronization sequence, whether a cross-correlation value between a synchronization sequence stored in the second device and the received synchronization sequence is greater than a preset threshold, and if the cross-correlation value is greater than the preset threshold, it indicates that the second device is within coverage of the first device and synchronizes with the first device; or otherwise, if the cross-correlation value is less than the preset threshold, the synchronization sequence cannot be detected, and if the second device is outside the coverage of the first device, the second device cannot access the network side device by using the first device.

Second case: The synchronization manner of the second device is that the second device synchronizes with the network side device.

In this case, N+1 sequences still need to be configured for the first device, that is, N second paging sequences and one measurement sequence that are shown in Table 2.

TABLE 2

N+1 sequences
Measurement sequence
Second paging sequence 1
...
Second paging sequence N Specifically, when the second device synchronizes with the network side device, the first device does not need to send the synchronization sequence. However, the second device needs to send the measurement sequence, after receiving the measurement sequence, the second device determines, by detecting a sequence, whether a cross-correlation value between the measurement sequence and a measurement sequence stored in the second device is greater than a preset threshold, and if cross-correlation value is greater than the preset threshold, it indicates that the second device is within the coverage of the first device; or otherwise, if the cross-correlation value is less than the preset threshold, and if the second device is outside the coverage of the first device, the second device cannot access the network side device by using the first device.

II. The synchronization sequence and the second paging sequence are configured for the second device.

Specifically, there may be the following two cases according to a quantity of second paging sequences configured for the second device.

First case: One synchronization sequence and one dedicated paging sequence are configured for the second device.

In this case, for a specific second device, the second device needs to learn only the synchronization sequence and the dedicated paging sequence of the second device. That is, only two sequences need to be configured for the second device.

Second case: One synchronization sequence and N second paging sequences are configured for the second device.

In this case, for a specific second device, the second device needs to learn the synchronization sequence and a second paging sequence corresponding to another second device, that is, N+1 sequences need to be configured for the second device, and the N+1 sequences include a dedicated paging sequence of the second device.

Compared with the first case, this case brings the following benefit: For the specific second device, when the first device pages the another second device, the second device may perform synchronization by using the second paging sequence corresponding to the another second device. For details, refer to FIG. 7 below.

After configuration of the synchronization sequence and the second paging sequence is described in detail, with reference to FIG. 4A, FIG. 4B, FIG. 5A, FIG. 5B, FIG. 6A, FIG. 6B, and FIG. 7, the following describes in detail a manner in which the first device sends a synchronization sequence according to a synchronization cycle and sends L paging sequences according to a paging cycle. In all accompanying drawings, the second paging sequence is represented by a pattern filled with slash lines; the synchronization sequence is represented by a pattern filled with dots; sending no sequence is represented by a pattern filled with horizontal lines; and a measurement sequence is represented by an unfilled pattern. Second paging sequences in all the accompanying drawings are L second paging sequences sent in an overlapped manner. Specifically, the synchronization sequence and the paging sequence may be sent in the following three manners:

Manner 1: The first device constantly sends the synchronization sequence according to the synchronization cycle, and constantly sends the paging sequence according to the paging cycle.

In this manner, the synchronization cycle is shorter than or equal to the paging cycle, the $X^{th}$ paging cycle includes P synchronization moments, and the paging moment of the $X^{th}$ paging cycle and the P synchronization moments meet either of the following conditions: one of the P synchronization moments is the same as the paging moment of the $X^{th}$ paging cycle, or none of the P synchronization moments is the same as the paging moment of the $X^{th}$ paging cycle, where P≥1. For details, refer to FIG. 4A and FIG. 4B.

FIG. 4A is a schematic diagram of a first manner provided in an embodiment of a paging method according to the present invention. As shown in FIG. 4A, an $X^{th}$ paging cycle includes five synchronization moments, and a paging moment of one paging cycle is the same as one of the five synchronization moments included in the $X^{th}$ paging cycle, that is, sending a second paging sequence takes up a sending moment of a synchronization sequence. In addition, because the synchronization sequence is orthogonal to the second paging sequence, the second synchronization sequence and the synchronization sequence may be sent in an overlapped manner.

Referring to FIG. 4A, a first device sends L second paging sequences and the synchronization sequence in the overlapped manner at paging moments of the $X^{th}$ paging cycle and an $(X+1)^{th}$ paging cycle.

Figure 4B:
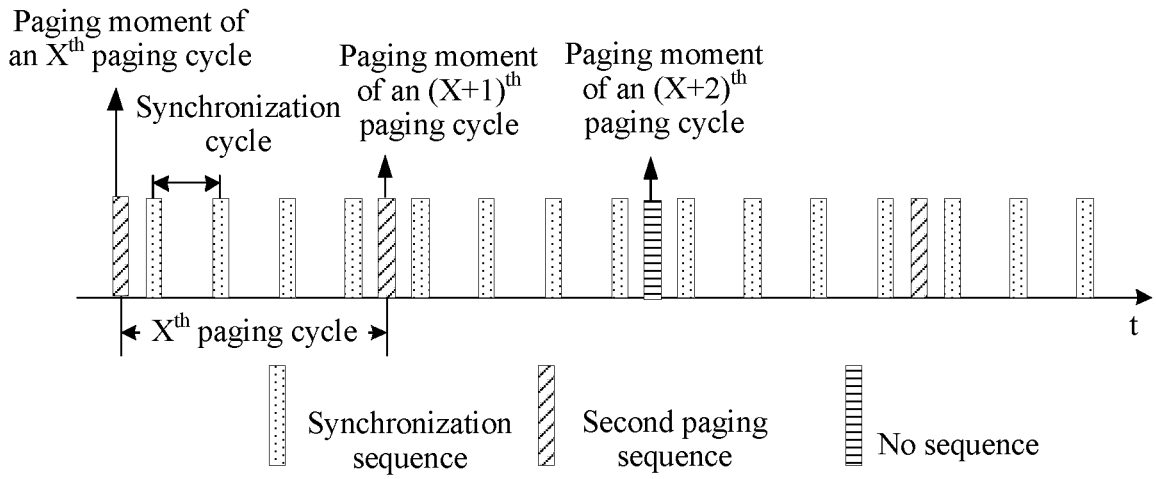
FIG. 4B is a schematic diagram of a first manner provided in another embodiment of a paging method according to the present invention.

FIG. 4B is a schematic diagram of a first manner provided in another embodiment of a paging method according to the present invention. As shown in FIG. 4B, one paging cycle includes four synchronization moments, and a paging moment of the paging cycle is different from all the four synchronization moments included in the paging cycle, that is, a second paging sequence is sent independently of a synchronization sequence.

Referring to FIG. 4B, a second device sends L second paging sequences at a paging moment of an $X^{th}$ paging cycle. Additionally, a synchronization moment of a synchronization cycle is different from the paging moment.

In addition, in FIG. 4A and FIG. 4B, when the first device does not have a paging requirement at the paging moment of the $X^{th}$ paging cycle, the first device stops sending any second paging sequence, but still sends the synchronization sequence at P synchronization cycles, for example, at a paging moment of an $(X+^2)^{th}$ paging cycle shown in FIG. 4A; or when the first device does not have a paging requirement at the paging moment of the $X^{th}$ paging cycle, the first device stops sending the second paging sequence and the synchronization sequence, and determines whether duration following a paging moment of an $(X-1)^{th}$ paging cycle exceeds a first threshold, and if the duration following the paging moment of the $(X-1)^{th}$ paging cycle exceeds the first threshold, the first device sends Q measurement signals to N second devices, where Q≥1. A measurement signal is not shown in FIG. 4A or FIG. 4B. It should be noted that, if the first device does not have the paging requirement, FIG. 4A and FIG. 4B show only a solution in which the first device stops sending the second paging sequence, but does not stop sending the synchronization sequence, and do not show a solution of stopping sending the second paging sequence and the synchronization sequence.

Manner 2: The first device sends the synchronization sequence only in a period of time before the paging moment, that is, before the paging moment of the $X^{th}$ paging cycle, the first device first sends P synchronization sequences, and then sends the second paging sequence at the paging moment of the $X^{th}$ paging cycle.

Specifically, if the synchronization cycle is shorter than the paging cycle, when the first device needs to page M second devices at the paging moment of the $X^{th}$ paging cycle, the first device sends a synchronization signal to the N second devices at each synchronization moment of the P synchronization cycles in sequence, and sends the L second paging signals to the N second devices at the paging moment of the $X^{th}$ paging cycle, where the P synchronization cycles are earlier than the $X^{th}$ paging cycle, and P≥1. For details, refer to FIG. 5A and FIG. 5B.

Figure 5A:
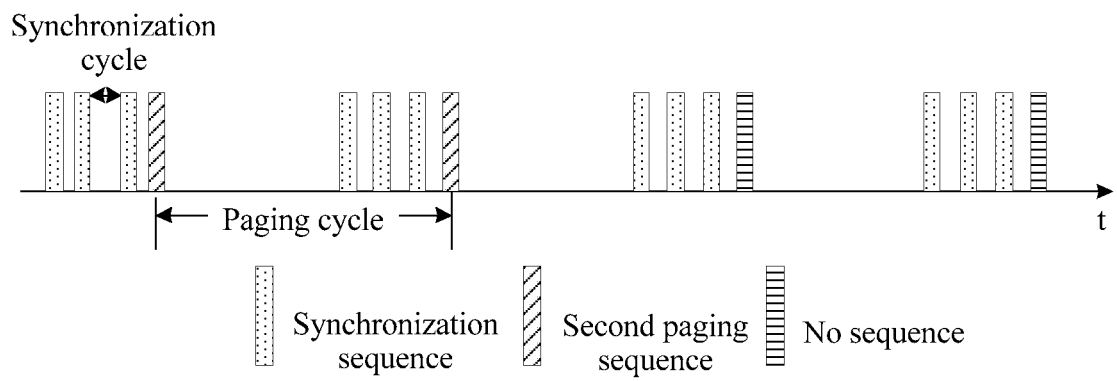
FIG. 5A is a schematic diagram of a second manner provided in an embodiment of a paging method according to the present invention.

FIG. 5A is a schematic diagram of a second manner provided in an embodiment of a paging method according to the present invention. As shown in FIG. 5A, a first device sends a synchronization sequence at synchronization moments of three synchronization cycles before one paging cycle, and then sends a second paging sequence at a paging moment of the paging cycle.

In this manner, the first device does not need to constantly send the synchronization sequence, but awakes in a period of time before the paging moment to send P synchronization sequences, so that the second device first synchronizes with the first device and then detects the second paging sequence, and further, the second device is in a sleep state at other time without a need to detect the synchronization sequence of the first device, thereby saving power and resources of the first device and the second device.

Figure 5B:
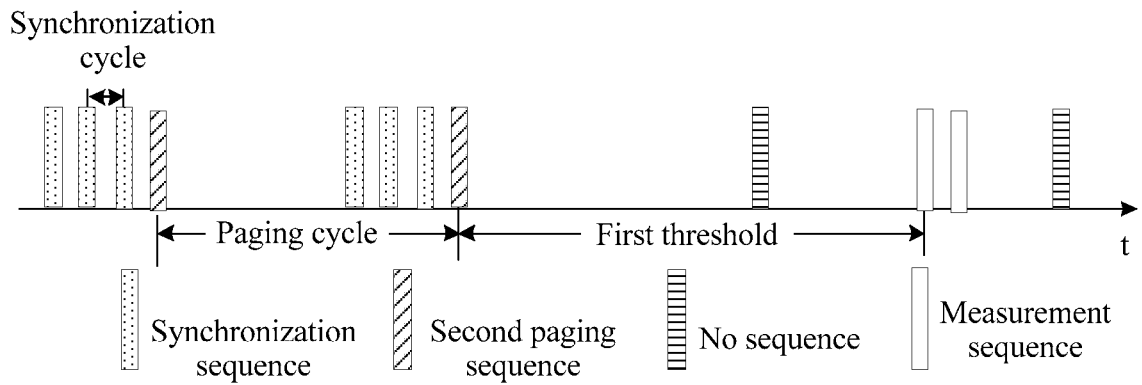
FIG. 5B is a schematic diagram of a second manner provided in another embodiment of a paging method according to the present invention.

In addition, if the first device does not need to page the M second devices at the paging moment of the $X^{th}$ paging cycle, the first device sends the synchronization signal to the N second devices at each synchronization moment of the P synchronization cycles, but stops sending the L second paging signals to the N second devices at the paging moment of the $X^{th}$ paging cycle. For details, refer to FIG. 5A. Alternatively, the first device stops sending the synchronization sequence to the second device at the synchronization moment of the P synchronization cycles, stops sending the L second paging sequences to the N second devices at the paging moment of the $X^{th}$ paging cycle, and determines whether duration following a paging moment of an $(X-1)^{th}$ paging cycle exceeds a first threshold, and if the duration following the paging moment of the $(X-1)^{th}$ paging cycle exceeds the first threshold, the first device sends Q measurement signals to the N second devices, where Q≥1. For details, refer to FIG. 5B. FIG. 5B is a schematic diagram of a second manner provided in another embodiment of a paging method according to the present invention.

Manner 3: The first device simultaneously sends the synchronization sequence and the second paging sequence, that is, the synchronization cycle is equal to the paging cycle, and a synchronization moment of each synchronization cycle coincides with the paging moment of the paging cycle.

Specifically, if the synchronization cycle is equal to the paging cycle, when the first device needs to page the M second devices at the paging moment of the $X^{th}$ paging cycle, the first device sends the synchronization signal to the N second devices at the synchronization moment of the P synchronization cycles, and sends the L second paging signals to the N second devices at the paging moment of the $X^{th}$ paging cycle, where the synchronization moment of the P synchronization cycles is the same as the paging moment of the $X^{th}$ paging cycle, and P=1. For details, refer to FIG. 6A and FIG. 6B.

Figure 6A:
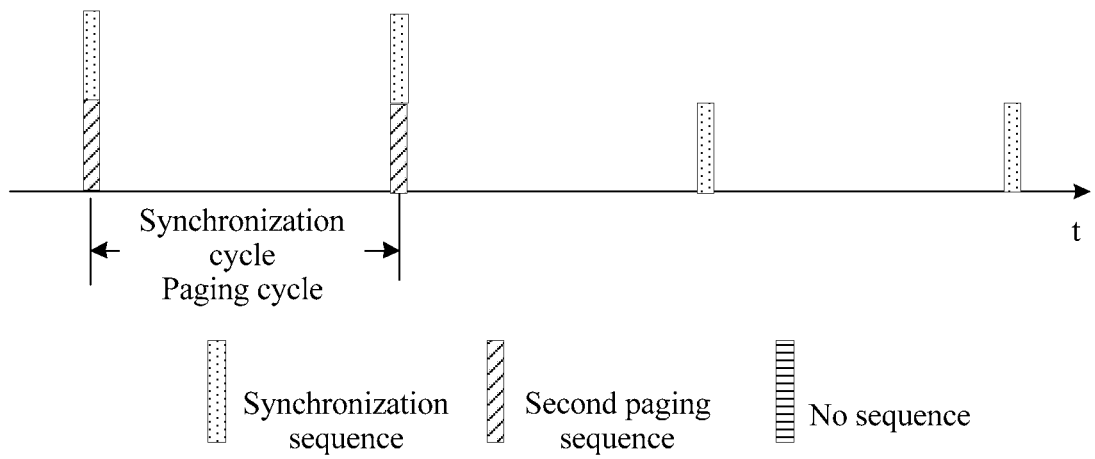
FIG. 6A is a schematic diagram of a third manner provided in an embodiment of a paging method according to the present invention.

FIG. 6A is a schematic diagram of a third manner provided in an embodiment of a paging method according to the present invention. As shown in FIG. 6A, a second device simultaneously sends a synchronization sequence and a second paging sequence at a paging moment of each paging cycle.

In this manner, the second paging sequence and the synchronization sequence are sent in an overlapped manner. This is different from the first manner in which at least one synchronization sequence needs to be sent in each paging cycle and the second manner in which at least one synchronization sequence needs to be sent before each paging cycle. Therefore, power and resources of the first device may be saved.

In this manner, the first device may not send the synchronization sequence at each paging moment. In this case, the second device needs to learn a second paging sequence corresponding to each second device in the N second devices connected to the first device. When the first device pages the second device, the second device performs synchronization by using the second paging sequence, and simultaneously completes detecting the paging sequence. The second device detects, in a blind detection manner, whether the second device is a second device paged by the first device.

In this manner, each time the second device awakes, the second device first performs synchronization by detecting the synchronization sequence at the paging moment, then performs cross-correlation by using a dedicated paging sequence stored by a user and each second paging sequence in the received L second paging sequences, and determines whether a cross-correlation value between the dedicated paging sequence and one of the L paging sequences exceeds a third threshold; and if the cross-correlation value exceeds the third threshold, the second device determines that the second device is a second device paged by a network side device.

Figure 6B:
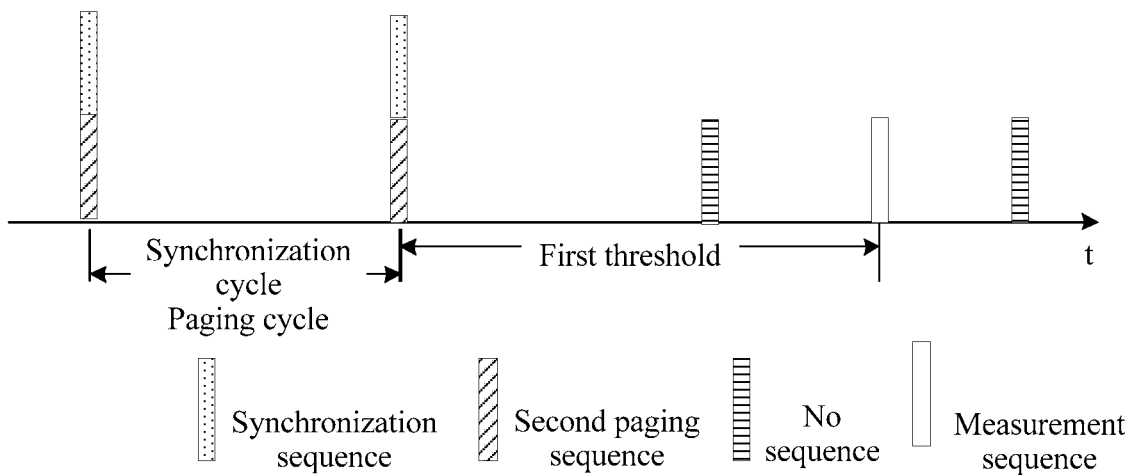
FIG. 6B is a schematic diagram of a third manner provided in another embodiment of a paging method according to the present invention.

In addition, if the first device does not need to page the M second devices at the paging moment of the $X^{th}$ paging cycle, the first device sends the synchronization signal to the N second devices at each synchronization moment of the P synchronization cycles, but stops sending the L second paging signals to the N second devices at the paging moment of the $X^{th}$ paging cycle. For details, refer to FIG. 6A. In brief, in FIG. 6A, if the first device does not need to page the M second devices at the paging moment of the $X^{th}$ paging cycle, the first device sends only the synchronization sequence at the paging moment; or the first device stops sending the synchronization sequence to the second device at the synchronization moment of the P synchronization cycles, stops sending the L second paging sequences to the N second devices at the paging moment of the $X^{th}$ paging cycle, and determines whether duration following a paging moment of an $(X-1)^{th}$ paging cycle exceeds a first threshold, and if the duration following the paging moment of the $(X-1)^{th}$ paging cycle exceeds the first threshold, the first device sends Q measurement signals to the N second devices, where Q≥1. For details, refer to FIG. 6B. FIG. 6B is a schematic diagram of a third manner provided in another embodiment of a paging method according to the present invention. In brief, in FIG. 6B, if the first device does not need to page the M second devices at the paging moment of the $X^{th}$ paging cycle, the first device does not send the synchronization sequence or the second paging sequence at the paging moment, and determines whether the duration following the paging moment of the $(X-1)^{th}$ paging cycle exceeds the first threshold, and if the duration following the paging moment of the $(X-1)^{th}$ paging cycle exceeds the first threshold, the first device sends the Q measurement signals to the N second devices, where $Q≥1$.

In FIG. 5B and FIG. 6B, the measurement signal is the same as or different from the synchronization signal. In a possible implementation, the measurement signal is specifically a measurement sequence, and the second device prestores the measurement sequence. If the duration following the paging moment of the $(X-1)^{th}$ paging cycle exceeds the first threshold, after the second device receives the Q measurement signals sent by the first device, the second device determines whether a cross-correlation value between the pre-stored measurement sequence and the received measurement sequence exceeds a second threshold; and if the cross-correlation value between the pre-stored measurement sequence and the received measurement sequence exceeds the second threshold, the second device determines that the second device is within coverage of the first device.

In the foregoing embodiments, in a paging process and a synchronization process, the L second paging signals are L paging sequences orthogonal to each other, and the synchronization signal is a synchronization sequence orthogonal to each paging sequence. The first device sends the synchronization sequence according to a synchronization cycle, and sends the second paging sequence according to a paging cycle. Accordingly, the second device cyclically awakes, detects the second paging sequence in a sequence detection manner to determine whether the first device is paging the second device, and detects the synchronization sequence in the sequence detection manner to determine whether the second device synchronizes with the first device. Specifically, after receiving the L second paging sequences, the second device performs cross-correlation by using a dedicated paging sequence of the second device and the L second paging sequences, and if a cross-correlation value between the dedicated paging sequence of the second device and one of the L second paging sequences is greater than a preset threshold, it indicates that the second device is the second device paged by the first device. Likewise, after receiving the synchronization sequence, the second device performs cross-correlation by using the stored synchronization sequence and the received synchronization sequence, and if a cross-correlation value is greater than a preset threshold, it indicates that the second device synchronizes with the first device.

Figure 7:
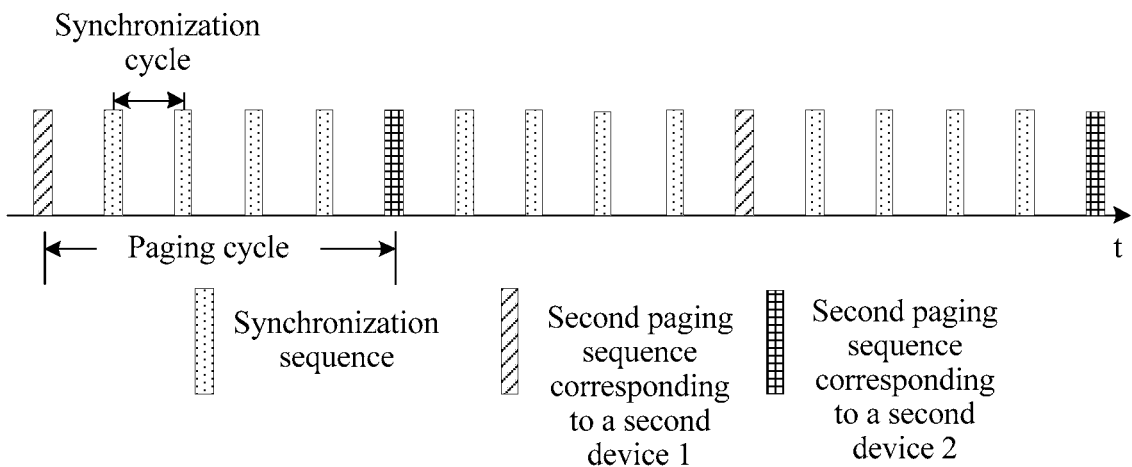
FIG. 7 is a schematic diagram of performing synchronization by a second device by using a second paging sequence corresponding to another second device in a paging method according to the present invention.

It may be learned from the foregoing second case of configuring a sequence for the second device that, in this configuration manner, for a specific second device, when the first device pages another second device, the second device may perform synchronization by using a second paging sequence corresponding to the another second device. The following describes in detail a manner in which the second device performs synchronization by using the second paging sequence corresponding to the another second device. For details, refer to FIG. 7. FIG. 7 is a schematic diagram of performing synchronization by a second device by using a second paging sequence corresponding to another second device in a paging method according to the present invention.

As shown in FIG. 7, a pattern filled with slash lines represents a second paging sequence used to page a second device 1, and a pattern filled with grids represents a second paging sequence used to page a second device 2. The second device 1 may perform synchronization by using the second paging sequence of the second device 2 at a moment at which the first device sends the second paging sequence of the second device 2. Likewise, the second device 2 may perform synchronization by using a second paging sequence of the second device 1 at a moment at which the first device sends the second paging sequence of the second device 1.

Figure 8:
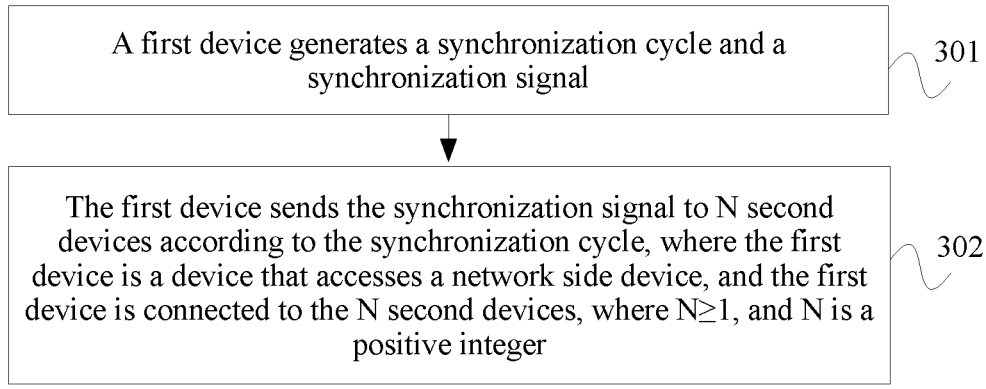
FIG. 8 is a flowchart of Embodiment 1 of a synchronization method according to the present invention.

FIG. 8 is a flowchart of Embodiment 1 of a synchronization method according to the present invention. An execution body in this embodiment is a first device, and the synchronization method is applicable to a scenario in which a second device needs to synchronize with the first device. Specifically, this embodiment includes the following steps:

301. The first device generates a synchronization cycle and a synchronization signal.

In this step, the first device generates the synchronization cycle and the synchronization signal according to a clock of the first device.

302. The first device sends the synchronization signal to N second devices according to the synchronization cycle, where the first device is a device that accesses a network side device, and the first device is connected to the N second devices, where $N≥1$, and N is a positive integer.

Sending the synchronization signal to the N second devices may be sending the synchronization signal to the N second devices in a broadcast manner.

Generally, if the second device synchronizes with the network side device, the second device can implement downlink frequency synchronization and downlink timing only by using the network side device. In this case, if the first device and the second device use a downlink frequency band, there is no problem when the first device communicates with the second device; or if the first device and the second device use an uplink frequency band, the second device needs to convert the downlink frequency synchronization into uplink frequency synchronization, however, the second device can send a signal only by using the downlink timing. Therefore, sending duration needs to be shortened when sending is performed, for example, one sending symbol is reduced in one subframe, so as to avoid interference in a normal uplink signal that is caused when a signal is sent by using the downlink timing and by occupying an uplink resource.

In addition, if the first device and the second device use an unlicensed frequency band, the foregoing problem still exists, conversion of frequency synchronization needs to be predefined, and timing needs to be adjusted, or a sent symbol needs to be reduced.

In conclusion, it may be learned from the above that, to enable the second device to synchronize with a network, conversion of frequency synchronization needs to be performed according to a frequency band used for communication between the first device and the second device, and impact of inaccurate timing synchronization needs to be handled. This affects system performance to some extent and increases complexity of device implementation.

To resolve the foregoing problem, in this embodiment, the second device synchronizes with the first device, so that the first device and the second device can normally communicate regardless of any frequency band (an LTE downlink frequency band, an LTE uplink frequency band, or an unlicensed frequency band) used for communication between the first device and the second device, without affecting system performance or increasing complexity of device implementation.

Specifically, in this step, the first device sends, according to the synchronization cycle, the synchronization signal to the N second devices connected to the first device, and may perform sending in the broadcast manner. For example, the first device sends, by means of broadcast, the synchronization signal at a synchronization moment of each synchronization cycle, and accordingly, the second device cyclically awakes, receives the synchronization signal, and determines, according to the synchronization signal, whether the second device synchronizes with the first device. For example, when the synchronization signal is specifically a synchronization sequence, the second device determines whether a cross-correlation value between a synchronization sequence stored in the second device and the received synchronization sequence is greater than a preset fourth threshold, and if the cross-correlation value between the synchronization sequence stored in the second device and the received synchronization sequence is greater than the preset fourth threshold, it indicates that the second device synchronizes with the first device.

According to the synchronization method provided in this embodiment of the present invention, the first device sends the synchronization signal to the second device, so that the second device synchronizes with the first device according to the synchronization signal, thereby broadening a frequency used for communication between the first device and the second device and avoiding increasing the complexity of device implementation, without affecting the system performance.

Figure 9:
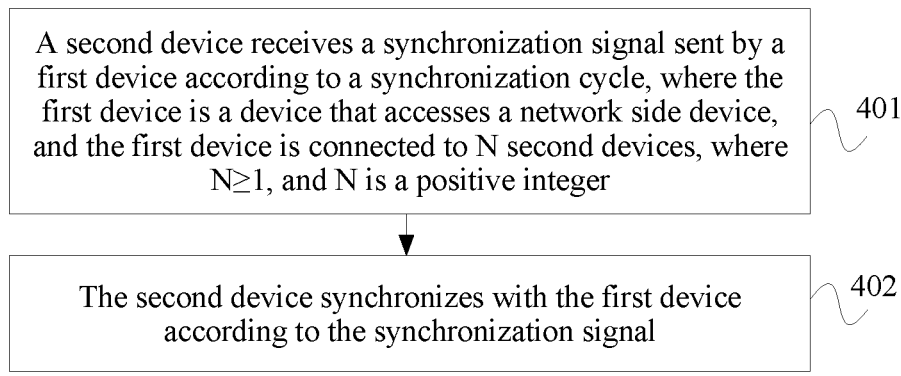
FIG. 9 is a flowchart of Embodiment 2 of a synchronization method according to the present invention.

FIG. 9 is a flowchart of Embodiment 2 of a synchronization method according to the present invention. An execution body in this embodiment is a second device, and the synchronization method is applicable to a scenario in which the second device needs to synchronize with a first device. Specifically, this embodiment includes the following steps:

401. The second device receives a synchronization signal that is sent by the first device according to a synchronization cycle, where the first device is a device that accesses a network side device, and the first device is connected to N second devices, where N≥1, and N is a positive integer.

402. The second device synchronizes with the first device according to the synchronization signal.

Specifically, for descriptions about the synchronization signal and the synchronization cycle, refer to the foregoing embodiment in FIG. 8. Details are not described herein again.

According to the synchronization method provided in this embodiment of the present invention, the first device sends the synchronization signal to the second device, and accordingly, the second device receives the synchronization signal and synchronizes with the first device according to the synchronization signal, thereby broadening a frequency used for communication between the first device and the second device and avoiding increasing complexity of device implementation, without affecting system performance.

Optionally, in an embodiment of the present invention, the synchronization signal is specifically a synchronization sequence, each second device stores the synchronization sequence, and that the second device synchronizes with the first device according to the synchronization signal includes:

determining, by the second device, whether a cross-correlation value between the synchronization sequence stored in the second device and the received synchronization sequence exceeds a fourth threshold; and if the cross-correlation value between the synchronization sequence stored in the second device and the received synchronization sequence exceeds the fourth threshold, determining that the second device synchronizes with the first device.

Figure 10:
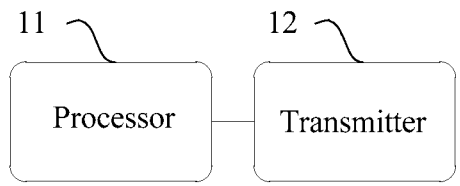
FIG. 10 is a schematic structural diagram of Embodiment 1 of a first device according to the present invention.

FIG. 10 is a schematic structural diagram of Embodiment 1 of a first device according to the present invention. The first device provided in this embodiment is an apparatus embodiment corresponding to the embodiment in FIG. 2 of the present invention, and a specific implementation process is not described herein again. Specifically, the first device provided in this embodiment includes:

a processor 11, configured to determine a second paging signal, where the second paging signal is a paging signal used by the first device to page a second device, the first device is a device that accesses a network side device, and the second device is a device that can access the network side device by using the first device; and a transmitter 12, configured to send the second paging signal determined by the processor 11 to the second device.

The first device provided in this embodiment of the present invention determines second paging signals used to page second devices, and sends the second paging signals to the second devices connected to the first device, so that the second devices determine, according to the second paging signals, whether the second devices are paged second devices, so that the first device or the network side device pages the second devices.

Figure 11:
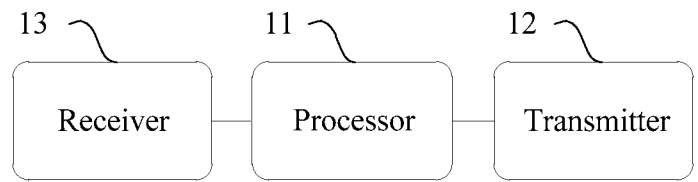
FIG. 11 is a schematic structural diagram of Embodiment 2 of a first device according to the present invention.

FIG. 11 is a schematic structural diagram of Embodiment 2 of a first device according to the present invention. As shown in FIG. 11, based on the structure in FIG. 10, further, the first device in this embodiment further includes:

a receiver 13, configured to: before the processor 11 determines the second paging signal, receive a first paging signal sent by the network side device, where the first paging signal is a paging signal used by the network side device to page the second device; where the processor 11 is specifically configured to determine the second paging signal according to the first paging signal.

Optionally, in an embodiment of the present invention, the transmitter 12 is further configured to send a synchronization signal to the second device according to a synchronization cycle.

Optionally, in an embodiment of the present invention, the first paging signal carries identities of M second devices, and the first device is connected to N second devices, where N≥1, 1≤M≤N, and N and M are positive integers;

the processor 11 is specifically configured to determine L second paging signals according to the identities of the M second devices, where the L second paging signals are different from each other, and 1≤L≤M; and the transmitter 12 is specifically configured to: send the L second paging signals when the M second devices need to be paged at a paging moment of an $X^{th}$ paging cycle, where the $X^{th}$ paging cycle is any paging cycle of paging the second device by the first device; and send the synchronization signal to the N second devices according to the synchronization cycle.

Optionally, in an embodiment of the present invention, the synchronization cycle is shorter than or equal to the paging cycle, the $X^{th}$ paging cycle includes P synchronization moments, and the paging moment of the $X^{th}$ paging cycle and the P synchronization moments meet either of the following conditions: one of the P synchronization moments is the same as the paging moment of the $X^{th}$ paging cycle, or none of the P synchronization moments is the same as the paging moment of the $X^{th}$ paging cycle, where P≥1.

Optionally, in an embodiment of the present invention, the synchronization cycle is shorter than the paging cycle, and the transmitter 12 is specifically configured to: send a synchronization signal to the N second devices at each synchronization moment of P synchronization cycles in sequence, and send the L second paging signals to the N second devices at the paging moment of the $X^{th}$ paging cycle, where the P synchronization cycles are earlier than the paging moment of the $X^{th}$ paging cycle, and P≥1.

Optionally, in an embodiment of the present invention, the synchronization cycle is equal to the paging cycle, and the transmitter 12 is specifically configured to: send a synchronization signal to the N second devices at a synchronization moment of P synchronization cycles, and send M second paging signals to the N second devices at the paging moment of the $X^{th}$ paging cycle, where the synchronization moment of the P synchronization cycles is the same as the paging moment of the $X^{th}$ paging cycle, and P=1.

Optionally, in an embodiment of the present invention, the transmitter 12 is further configured to: if the first device does not need to page the M second devices at the paging moment of the $X^{th}$ paging cycle, send the synchronization signal to the N second devices at the synchronization moment of the P synchronization cycles, but stop sending the L second paging signals to the N second devices at the paging moment of the $X^{th}$ paging cycle; or stop sending the synchronization signal to the N second devices at the synchronization moment of the P synchronization cycles, stop sending the L second paging signals to the N second devices at the paging moment of the $X^{th}$ paging cycle, and determine whether duration following a paging moment of an $(X-1)^{th}$ paging cycle exceeds a first threshold, and if the duration following the paging moment of the $(X-1)^{th}$ paging cycle exceeds the first threshold, send Q measurement signals to the N second devices, where Q≥1.

Optionally, in an embodiment of the present invention, the measurement signal is the same as or different from the synchronization signal.

Optionally, in an embodiment of the present invention, the L second paging signals are L paging sequences orthogonal to each other, and the synchronization signal is a synchronization sequence orthogonal to each paging sequence.

Figure 12:
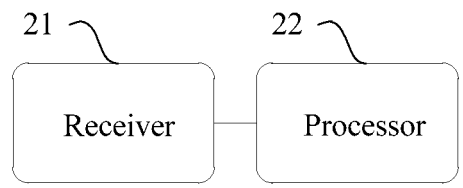
FIG. 12 is a schematic structural diagram of Embodiment 1 of a second device according to the present invention.

FIG. 12 is a schematic structural diagram of Embodiment 1 of a second device according to the present invention. The second device provided in this embodiment is an apparatus embodiment corresponding to the embodiment in FIG. 3 of the present invention, and a specific implementation process is not described herein again. Specifically, the second device provided in this embodiment includes:

a receiver 21, configured to receive a second paging signal sent by a first device, where the second paging signal is a paging signal used by the first device to page the second device, the first device is a device that accesses a network side device, and the second device is a device that can access the network side device by using the first device; and a processor 22, configured to: determine, according to the second paging signal received by the receiver 21, whether the second device is a paged second device, where if the second device is the paged second device, the second device accesses the network side device by using the first device, or if the second device is not the paged second device, the second device continues sleeping.

According to the second device provided in this embodiment of the present invention, the first device determines second paging signals used to page second devices, and sends the second paging signals to the second devices connected to the first device, and the second devices receive the second paging signals and determine, according to the second paging signals, whether the second devices are paged second devices, so that the first device or the network side device pages the second devices.

Optionally, in an embodiment of the present invention, the second paging signal is sent after the first device receives a first paging signal sent by the network side device, and the first paging signal is a paging signal used by the network side device to page the second device.

Optionally, in an embodiment of the present invention, the receiver 21 is further configured to receive a synchronization signal that is sent by the first device according to a synchronization cycle; and the processor 22 is further configured to synchronize with the first device according to the synchronization signal.

Optionally, in an embodiment of the present invention, the first paging signal carries identities of M second devices, the first device is connected to N second devices, and the N second devices include the M second devices, where N≥1, 1≤M≤N, and N and M are positive integers;

the receiver 21 is specifically configured to: if the first device needs to page the M second devices at a paging moment of an $X^{th}$ paging cycle, receive L second paging signals sent by the first device at the paging moment of the $X^{th}$ paging cycle, where the $X^{th}$ paging cycle is any paging cycle of paging the second device by the first device, the L second paging signals are determined by the first device according to the first paging signal, and the L second paging signals are different from each other, where 1≤L≤M; and the processor 22 is specifically configured to determine, according to the L second paging signals, whether the second device is the second device paged by the network side device.

Optionally, in an embodiment of the present invention, the synchronization cycle is shorter than or equal to the paging cycle, the $X^{th}$ paging cycle includes P synchronization moments, and the paging moment of the $X^{th}$ paging cycle and the P synchronization moments meet either of the following conditions: one of the P synchronization moments is the same as the paging moment of the $X^{th}$ paging cycle, or none of the P synchronization moments is the same as the paging moment of the $X^{th}$ paging cycle, where P≥1.

Optionally, in an embodiment of the present invention, the synchronization cycle is shorter than the paging cycle, the receiver 21 is specifically configured to receive the L second paging signals sent by the first device at the paging moment of the $X^{th}$ paging cycle, where the P synchronization cycles are earlier than the paging moment of the $X^{th}$ paging cycle, and P≥1.

Optionally, in an embodiment of the present invention, the synchronization cycle is equal to the paging cycle, and the receiver 21 is specifically configured to receive a synchronization signal sent by the first device to the N second devices at a synchronization moment of P synchronization cycles and the L second paging signals sent at the paging moment of the $X^{th}$ paging cycle, where the synchronization moment of the P synchronization cycles is the same as the paging moment of the $X^{th}$ paging cycle, and P=1.

Optionally, in an embodiment of the present invention, the receiver 21 is further configured to: if the first device does not need to page the M second devices at the paging moment of the $X^{th}$ paging cycle, receive the synchronization signal sent by the first device at the synchronization moment of the P synchronization cycles; or if duration following a paging moment of an $(X-1)^{th}$ paging cycle exceeds a first threshold, receive Q measurement signals sent by the first device, where the measurement signal is the same as or different from the synchronization signal, and Q≥1.

Optionally, in an embodiment of the present invention, the measurement signal is specifically a measurement sequence, and the second device pre-stores the measurement sequence; and the processor 22 is further configured to: if the duration following the paging moment of the $(X-1)^{th}$ paging cycle exceeds the first threshold, after the receiver 21 receives the Q measurement signals sent by the first device, determine whether a cross-correlation value between the pre-stored measurement sequence and the received measurement sequence exceeds a second threshold; and if the cross-correlation value between the pre-stored measurement sequence and the received measurement sequence exceeds the second threshold, determine that the second device is within coverage of the first device.

Optionally, in an embodiment of the present invention, the L second paging signals are L paging sequences orthogonal to each other, and the synchronization signal is a synchronization sequence orthogonal to each paging sequence.

Optionally, in an embodiment of the present invention, the second device stores a dedicated paging sequence, and the dedicated paging sequence is a sequence learned by the second device; and the processor 22 is specifically configured to: determine whether a cross-correlation value between the dedicated paging sequence and one of the L paging sequences exceeds a third threshold; and if the cross-correlation value between the dedicated paging sequence and the one of the L paging sequences exceeds the third threshold, determine that the second device is the second device paged by the network side device.

Figure 13:
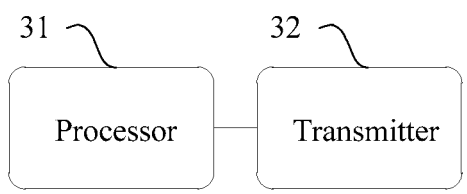
FIG. 13 is a schematic structural diagram of Embodiment 3 of a first device according to the present invention.

FIG. 13 is a schematic structural diagram of Embodiment 3 of a first device according to the present invention. The first device provided in this embodiment is an apparatus embodiment corresponding to the embodiment in FIG. 8 of the present invention, and a specific implementation process is not described herein again. Specifically, the first device provided in this embodiment includes:

a processor 31, configured to generate a synchronization cycle and a synchronization signal; and a transmitter 32, configured to send the synchronization signal to N second devices according to the synchronization cycle generated by the processor 31, where the first device is a device that accesses a network side device, and the first device is connected to the N second devices, where N≥1, and N is a positive integer.

According to the first device provided in this embodiment of the present invention, the first device sends the synchronization signal to the second device, so that the second device synchronizes with the first device according to the synchronization signal, thereby broadening a frequency used for communication between the first device and the second device and avoiding increasing complexity of device implementation, without affecting system performance.

Figure 14:
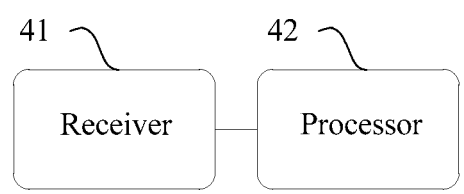
FIG. 14 is a schematic structural diagram of Embodiment 2 of a second device according to the present invention.

FIG. 14 is a schematic structural diagram of Embodiment 2 of a second device according to the present invention. The second device provided in this embodiment is an apparatus embodiment corresponding to the embodiment in FIG. 9 of the present invention, and a specific implementation process is not described herein again. Specifically, the second device provided in this embodiment includes:

a receiver 41, configured to receive a synchronization signal sent by a first device according to a synchronization cycle, where the first device is a device that accesses a network side device, and the first device is connected to N second devices, where N≥1, and N is a positive integer; and a processor 42, configured to synchronize with the first device according to the synchronization signal received by the receiver 41.

According to the second device provided in this embodiment of the present invention, the first device sends the synchronization signal to the second device, and accordingly, the second device receives the synchronization signal and synchronizes with the first device according to the synchronization signal, thereby broadening a frequency used for communication between the first device and the second device and avoiding increasing complexity of device implementation, without affecting system performance.

Optionally, in an embodiment of the present invention, the synchronization signal is specifically a synchronization sequence, and each second device stores the synchronization sequence; and the processor 42 is specifically configured to: determine whether a cross-correlation value between the synchronization sequence stored in the second device and the received synchronization sequence exceeds a fourth threshold; and if the cross-correlation value between the synchronization sequence stored in the second device and the received synchronization sequence exceeds the fourth threshold, determine that the second device synchronizes with the first device.

Figure 15:
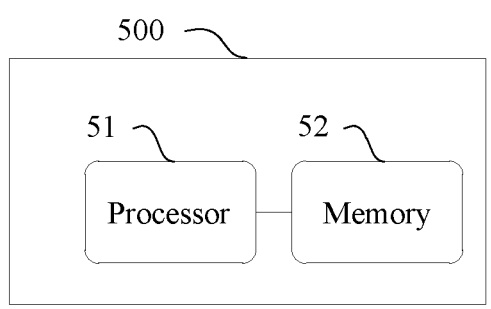
FIG. 15 is a schematic structural diagram of Embodiment 4 of a first device according to the present invention.

FIG. 15 is a schematic structural diagram of Embodiment 4 of a first device according to the present invention. As shown in FIG. 15, the first device 500 provided in this embodiment includes a processor 51 and a memory 52. The memory 52 stores an executable instruction; when the first device runs, the processor 51 communicates with the memory 52; and the processor 51 invokes the executable instruction in the memory 52 to execute the method embodiment shown in FIG. 2. An implementation principle and a technical effect of the first device are similar to those of the method embodiment, and details are not described herein again.

Figure 16:
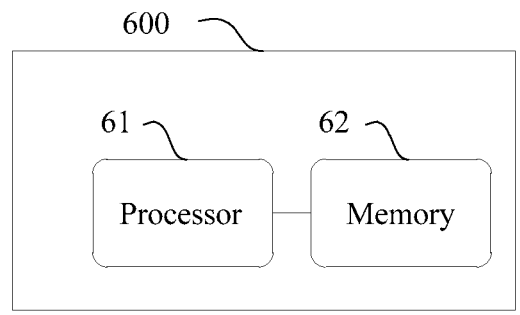
FIG. 16 is a schematic structural diagram of Embodiment 3 of a second device according to the present invention.

FIG. 16 is a schematic structural diagram of Embodiment 3 of a second device according to the present invention. As shown in FIG. 16, the second device 600 provided in this embodiment includes a processor 61 and a memory 62. The memory 62 stores an executable instruction; when the second device runs, the processor 61 communicates with the memory 62; and the processor 61 invokes the executable instruction in the memory 62 to execute the method embodiment shown in FIG. 3. An implementation principle and a technical effect of the second device are similar to those of the method embodiment, and details are not described herein again.

Figure 17:
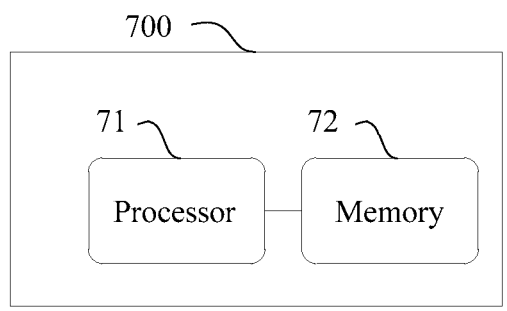
FIG. 17 is a schematic structural diagram of Embodiment 5 of a first device according to the present invention.

FIG. 17 is a schematic structural diagram of Embodiment 5 of a first device according to the present invention. As shown in FIG. 17, the first device 700 provided in this embodiment includes a processor 71 and a memory 72. The memory 72 stores an executable instruction; when the first device 700 runs, the processor 71 communicates with the memory 72; and the processor 71 invokes the executable instruction in the memory 72 to execute the method embodiment shown in FIG. 8. An implementation principle and a technical effect of the first device 700 are similar to those of the method embodiment, and details are not described herein again.

Figure 18:
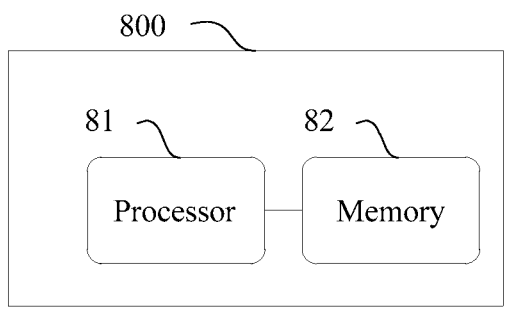
FIG. 18 is a schematic structural diagram of Embodiment 4 of a second device according to the present invention.

FIG. 18 is a schematic structural diagram of Embodiment 4 of a second device according to the present invention. As shown in FIG. 18, the second device 800 provided in this embodiment includes a processor 81 and a memory 82. The memory 82 stores an executable instruction; when the second device runs, the processor 81 communicates with the memory 82; and the processor 81 invokes the executable instruction in the memory 82 to execute the method embodiment shown in FIG. 9. An implementation principle and a technical effect of the second device are similar to those of the method embodiment, and details are not described herein again.

A person of ordinary skill in the art may understand that all or some of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, a person of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. User equipment, wherein the user equipment is a first device, and the first device comprises:
    a receiver, the receiver configured to receive a first paging signal sent by a network side device, wherein the first paging signal is a paging signal used by the network side device to page M second devices, wherein the first paging signal carries identities of the M second devices, wherein the first device is connected to N second devices, wherein N≥1, wherein 1≤M≤N, and wherein N and M are positive integers;
    at least one processor, the at least one processor configured to determine L second paging signals according to the first paging signal, wherein the L second paging signals are paging signals used by the first device to page the N second devices, wherein the first device is a device that accesses the network side device, wherein the N second devices are devices that can access the network side device by using the first device, wherein the L second paging signals are different from each other, and wherein 1≤L≤M; and
    a transmitter, the transmitter configured to:
        send the L second paging signals determined by the at least one processor to the N second devices when the M second devices need to be paged at a paging moment of an $X^{th}$ paging cycle, wherein the $X^{th}$ paging cycle is any paging cycle of paging the M second devices by the first device; and
        send a synchronization signal to the N second devices according to a synchronization cycle.

2. The device according to claim 1, wherein the synchronization cycle is shorter than or equal to the $X^{th}$ paging cycle, wherein the $X^{th}$ paging cycle comprises P synchronization moments, and wherein the paging moment of the $X^{th}$ paging cycle and the P synchronization moments meet either of the following conditions:
    one of the P synchronization moments is the same as the paging moment of the $X^{th}$ paging cycle; or
    none of the P synchronization moments is the same as the paging moment of the $X^{th}$ paging cycle,
    wherein P≥1.

3. The device according to claim 1, wherein the synchronization cycle is shorter than the $X^{th}$ paging cycle, and the transmitter is configured to:
    send a synchronization signal to the N second devices at each synchronization moment of P synchronization cycles in sequence; and
    send the L second paging signals to the N second devices at the paging moment of the $X^{th}$ paging cycle, wherein the P synchronization cycles are earlier than the paging moment of the $X^{th}$ paging cycle, and wherein P≥1.

4. The device according to claim 1, wherein the synchronization cycle is equal to the $X^{th}$ paging cycle, and wherein the transmitter is configured to:
    send a synchronization signal to the N second devices at a synchronization moment of P synchronization cycles; and
    send M second paging signals to the N second devices at the paging moment of the $X^{th}$ paging cycle, wherein the synchronization moment of the P synchronization cycles is the same as the paging moment of the $X^{th}$ paging cycle, and wherein P=1.

5. The device according to claim 1, wherein:
    the transmitter is further configured to, in response to determining that the first device does not need to page the M second devices at the paging moment of the $X^{th}$ paging cycle, perform one of:
        send the synchronization signal to the N second devices at a synchronization moment of P synchronization cycles and stop sending the L second paging signals to the N second devices at the paging moment of the $X^{th}$ paging cycle; or
        stop sending the synchronization signal to the N second devices at the synchronization moment of the P synchronization cycles, stop sending the L second paging signals to the N second devices at the paging moment of the $X^{th}$ paging cycle, determine whether duration following a paging moment of an $(X-1)^{th}$ paging cycle exceeds a first threshold, and in response to determining that the duration following the paging moment of the $(X-1)^{th}$ paging cycle exceeds the first threshold, send Q measurement signals to the N second devices, wherein Q≥1.

6. The device according to claim 5, wherein the measurement signal is the same as or different from the synchronization signal.

7. The device according to claim 1, wherein the L second paging signals are L paging sequences orthogonal to each other, and wherein the synchronization signal is a synchronization sequence orthogonal to each paging sequence.

8. A paging method, comprising:
    receiving, by a first device, a first paging signal sent by a network side device, wherein the first paging signal is a paging signal used by the network side device to page M second devices, wherein the first paging signal carries identities of the M second devices, wherein the first device is connected to N second devices, wherein N≥1, wherein 1≤M≤N, and wherein N and M are positive integers;
    determining, by the first device, L second paging signals according to the first paging signal, wherein the L second paging signals are paging signals used by the first device to page the N second devices, wherein the first device is a device that accesses the network side device, wherein the N second devices are devices that can access the network side device by using the first device, wherein the L second paging signals are different from each other, and wherein 1≤L≤M;

sending, by the first device, the L second paging signals to the N second devices when the M second devices need to be paged at a paging moment of an $X^{th}$ paging cycle, wherein the $X^{th}$ paging cycle is any paging cycle of paging the M second devices by the first device; and sending, by the first device, a synchronization signal to the N second devices according to a synchronization cycle.

9. The method according to claim 8, wherein the synchronization cycle is shorter than or equal to the $X^{th}$ paging cycle, wherein the $X^{th}$ paging cycle comprises P synchronization moments, and wherein the paging moment of the $X^{th}$ paging cycle and the P synchronization moments meet either of the following conditions:

one of the P synchronization moments is the same as the paging moment of the $X^{th}$ paging cycle; or none of the P synchronization moments is the same as the paging moment of the $X^{th}$ paging cycle, wherein $P \geq 1$.

10. The method according to claim 8, wherein the synchronization cycle is shorter than the $X^{th}$ paging cycle, and wherein the method further comprises:

sending a synchronization signal to the N second devices at each synchronization moment of P synchronization cycles in sequence; and sending the L second paging signals to the N second devices at the paging moment of the $X^{th}$ paging cycle, wherein the P synchronization cycles are earlier than the paging moment of the $X^{th}$ paging cycle, and wherein $P \geq 1$.

11. The method according to claim 8, wherein the synchronization cycle is equal to the $X^{th}$ paging cycle, and wherein the method further comprises:

sending a synchronization signal to the N second devices at a synchronization moment of P synchronization cycles; and sending M second paging signals to the N second devices at the paging moment of the $X^{th}$ paging cycle, wherein the synchronization moment of the P synchronization cycles is the same as the paging moment of the $X^{th}$ paging cycle, and wherein $P=1$.

12. The method according to claim 8, wherein the method further comprises:

in response to determining that the first device does not need to page the M second devices at the paging moment of the $X^{th}$ paging cycle:

sending the synchronization signal to the N second devices at a synchronization moment of P synchronization cycles and stopping sending the L second paging signals to the N second devices at the paging moment of the $X^{th}$ paging cycle; or stopping sending the synchronization signal to the N second devices at the synchronization moment of the P synchronization cycles, stopping sending the L second paging signals to the N second devices at the paging moment of the $X^{th}$ paging cycle, determining whether duration following a paging moment of an $(X-1)^{th}$ paging cycle exceeds a first threshold, and in response to determining that the duration following the paging moment of the $(X-1)^{th}$ paging cycle exceeds the first threshold, sending Q measurement signals to the N second devices, wherein $Q \geq 1$.

13. The method according to claim 12, wherein the measurement signal is the same as or different from the synchronization signal.

14. The method according to claim 8, wherein the L second paging signals are L paging sequences orthogonal to each other, and wherein the synchronization signal is a synchronization sequence orthogonal to each paging sequence.

* * * * *